United States Patent [19]

Kitamura et al.

[11] Patent Number: 5,130,837
[45] Date of Patent: Jul. 14, 1992

[54] OPTICAL REPEATER HAIVNG MEANS FOR PREVENTING MALFUNCTION DUE TO THE PRESENCE OF NOISE

[75] Inventors: Mitsuo Kitamura, Kawasaki; Katsumi Kikawa, Ichikawa, both of Japan

[73] Assignee: Fujitsu Limited, Kawasaki, Japan

[21] Appl. No.: 558,432

[22] Filed: Jul. 27, 1990

[30] Foreign Application Priority Data

Jul. 27, 1989 [JP] Japan .................. 1-195303

[51] Int. Cl.⁵ .......................................... H04B 10/02
[52] U.S. Cl. ................................ 359/174; 359/177
[58] Field of Search ............... 455/601, 606, 7; 375/3; 359/174, 175, 176, 177

[56] References Cited

U.S. PATENT DOCUMENTS

| | | | |
|---|---|---|---|
| 4,278,850 | 7/1981 | Sato et al. | 455/601 |
| 4,295,225 | 10/1981 | Pan | 455/601 |
| 4,449,247 | 5/1984 | Waschka, Jr. | 455/601 |
| 4,710,976 | 12/1987 | Wakabayashi et al. | 455/601 |

FOREIGN PATENT DOCUMENTS

| | | |
|---|---|---|
| 54-50381 | 3/1979 | Japan . |
| 55-100760 | 7/1980 | Japan . |
| 57-148433 | 9/1982 | Japan . |
| 60-58731 | 4/1985 | Japan . |
| 63-72228 | 9/1986 | Japan . |

Primary Examiner—Edward L. Coles, Sr.
Assistant Examiner—Kinfe-Michael Negash
Attorney, Agent, or Firm—Staas & Halsey

[57] ABSTRACT

An optical repeater provided in an up line and a down line, the optical repeater includes a first circuit related to the up line, and a second circuit related to the down line. Each circuit includes an optical receive/decision circuit, a command extraction circuit, a command detection circuit, a command switch and a supervisory circuit. Each circuit also includes a noise component processing circuit which extracts, from the electrical signal, a noise component within a predetermined frequency range excluding a frequency of the command signal and determines whether or not the optical signal is input to the optical receive/decision circuit on the basis of the noise component and which prevents the noise component passing through the command extracting circuit from being directly applied to the command detecting circuit when it is determined that no the optical input is input to the optical receive/decision circuit. Each circuit further includes an output circuit which converts the data signal and a supervisory signal into an optical output which is transferred to a corresponding one of the up line and the down line.

36 Claims, 12 Drawing Sheets

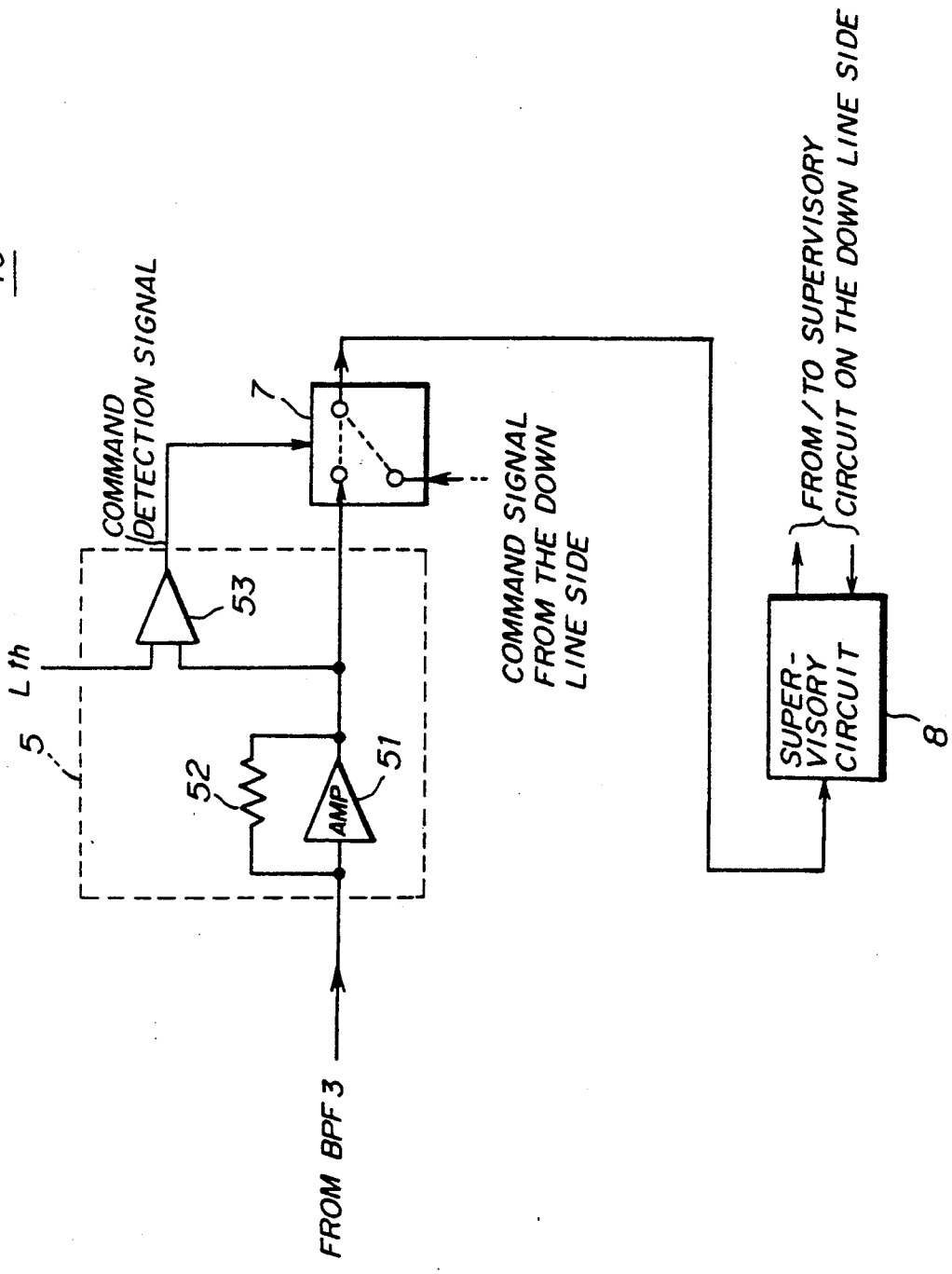

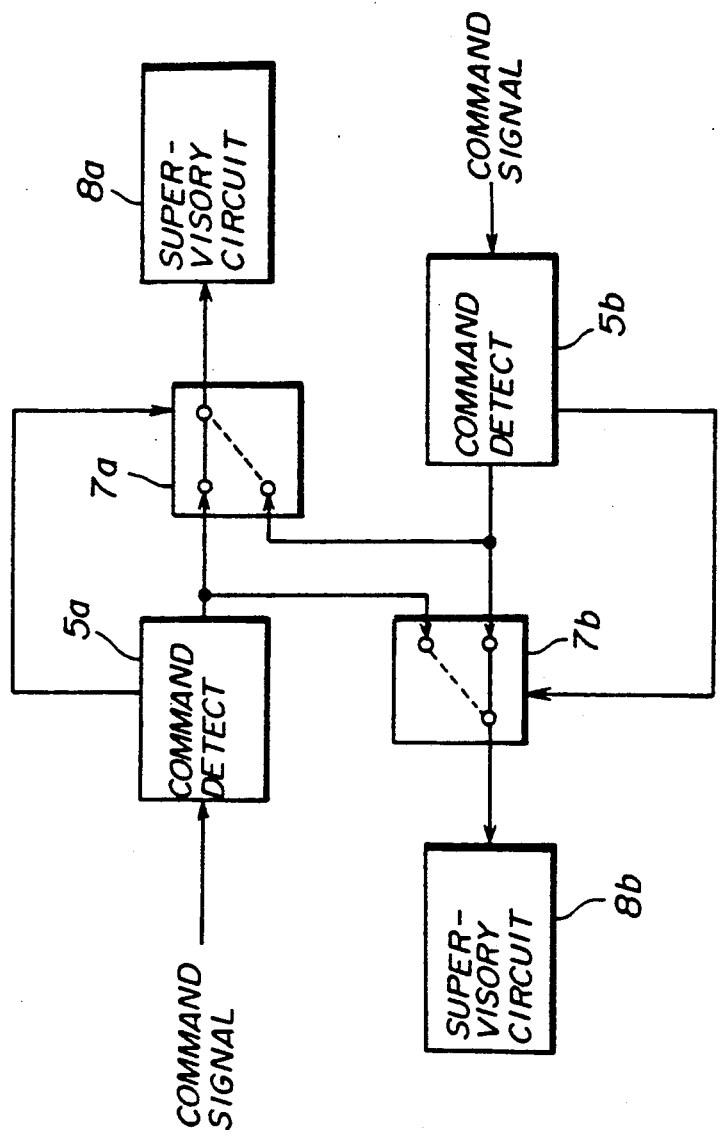

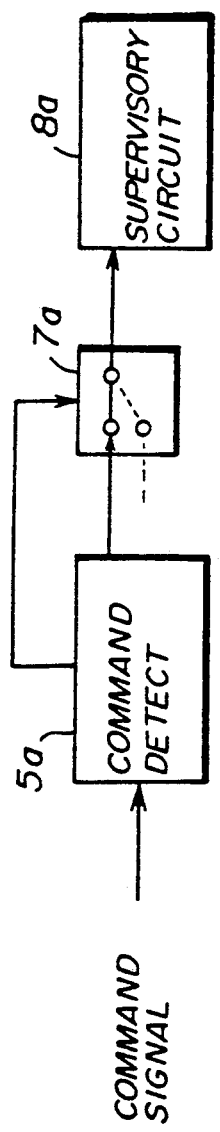
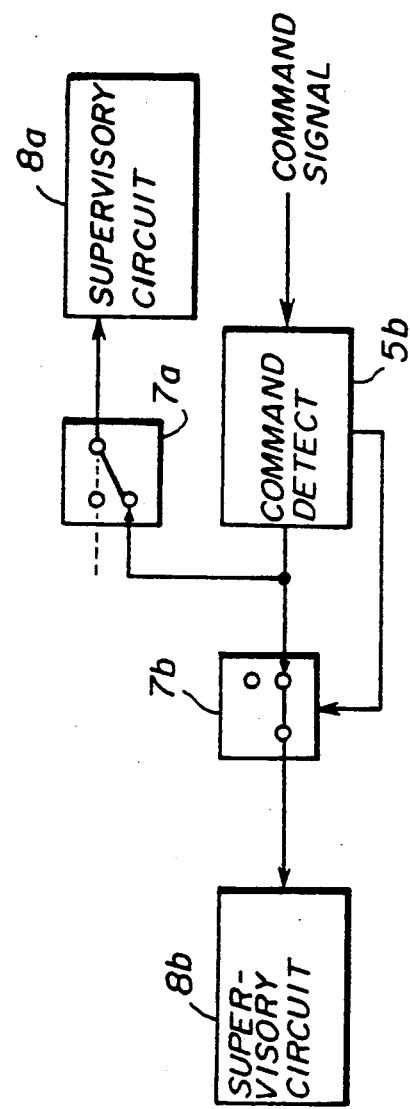

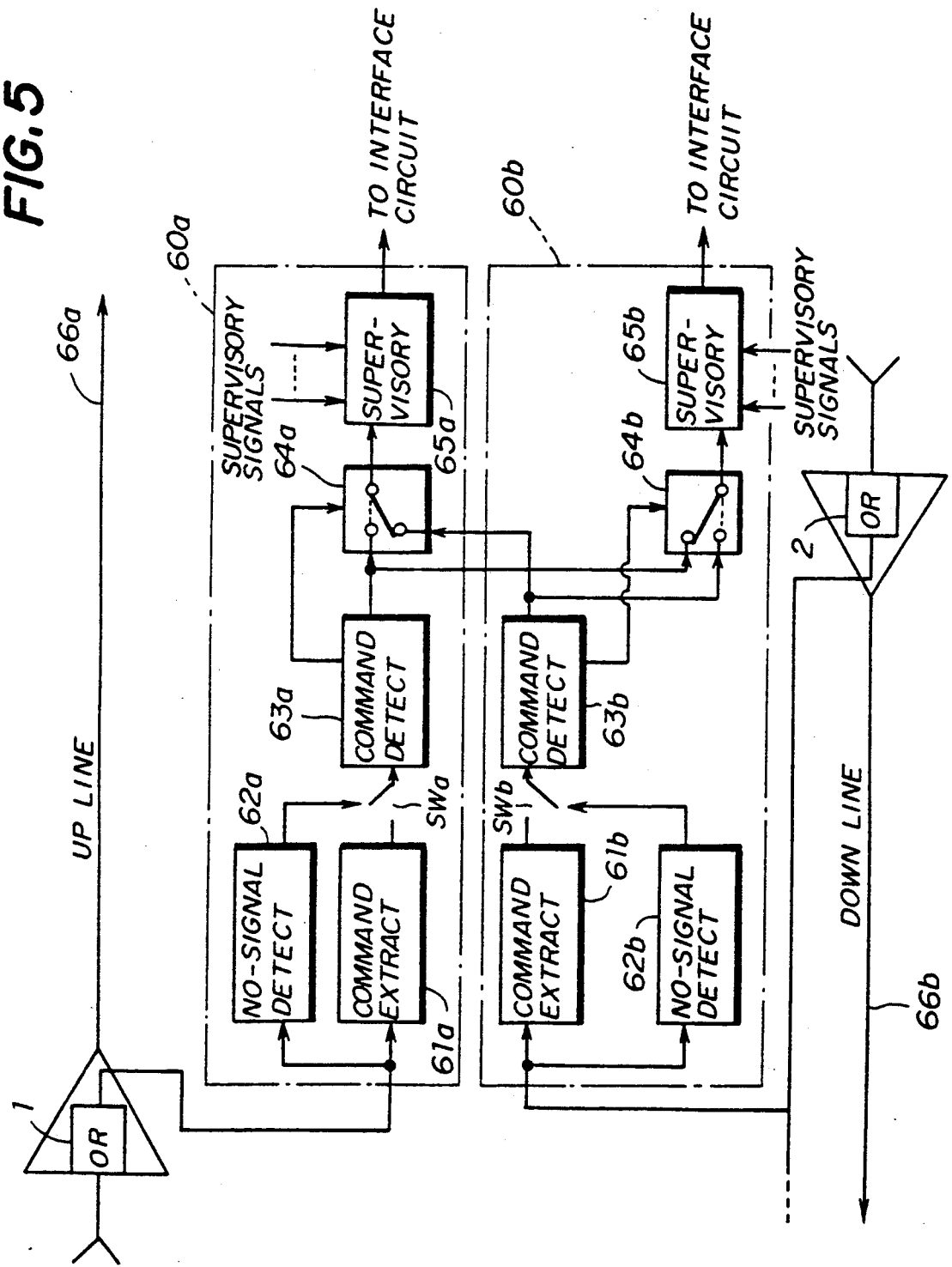

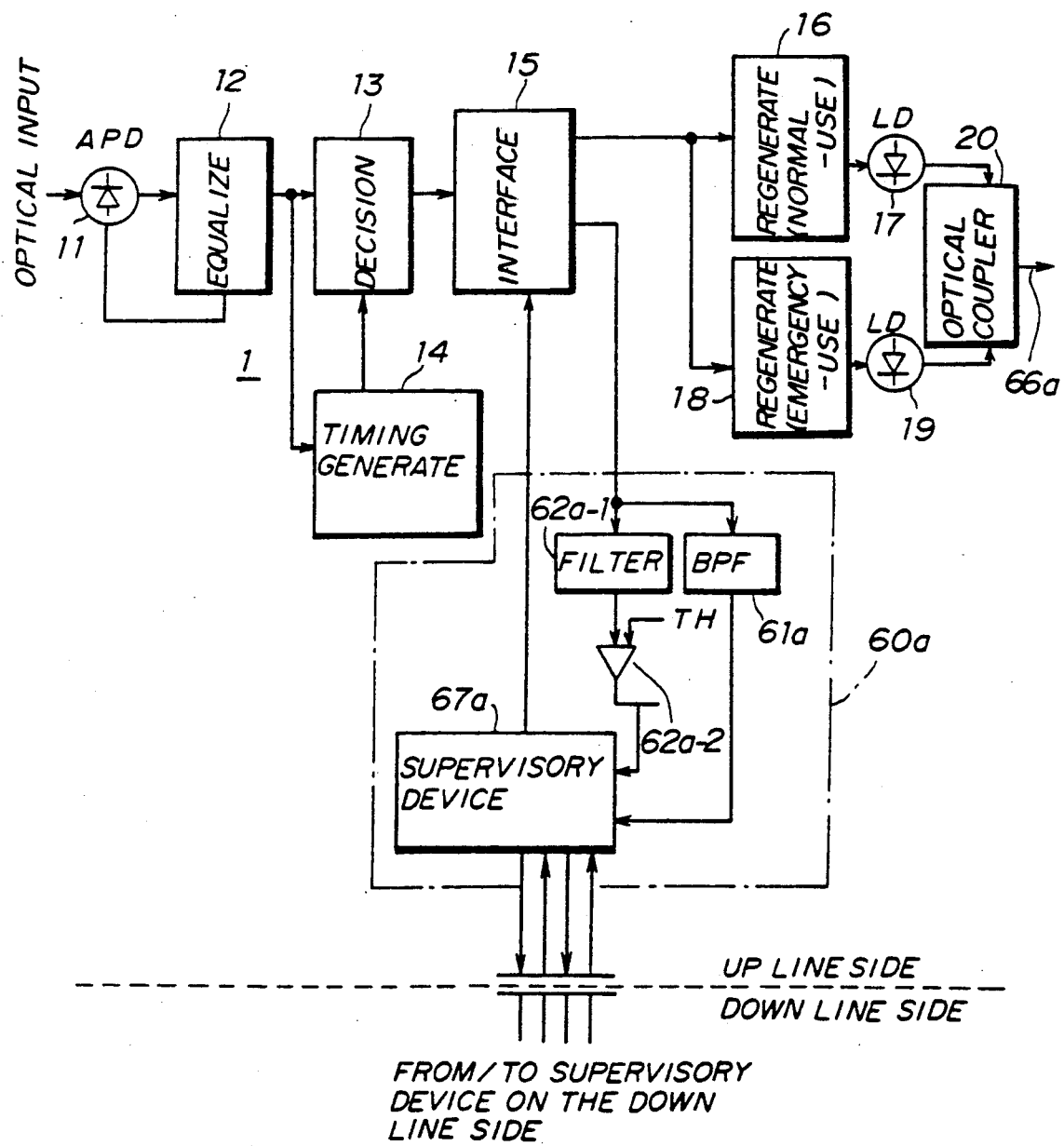

OPTICAL REPEATER HAIVNG MEANS FOR PREVENTING MALFUNCTION DUE TO THE PRESENCE OF NOISE

BACKGROUND OF THE INVENTION

The present invention generally relates to an optical repeater, and more particularly to an optical repeater that prevents malfunctions due to the presence of noise.

In optical communication systems, optical repeaters are provided in an optical fiber cable at predetermined intervals so that the occurrence of a receipt error due to the length of the optical fiber cable can be prevented. On the other hand, each optical repeater also serves as a noise source. Thus, there is also an error which takes place during signal processing of each optical repeater. Such signal processing errors increase with an increase in the number of optical repeaters. From this point of view, each optical repeater is equipped with a supervisory circuit, which supervises structural elements of the optical repeater and outputs supervisory signals indicating the operating state of each structural element.

Referring to FIG. 1, there is illustrated a conventional optical repeater. The configuration shown in FIG. 1 is provided in an up line, and the same configuration is provided in a down line. An avalanche photodiode (hereafter simply referred to as an APD) 11 receives an optical input signal sent from a terminal or an adjacent optical repeater (not shown) via the up line, and converts the optical input signal into an electrical signal. An equalizer 12 equalizes the electrical signal having a distortion by feeding back a control signal to the APD 11. That is, the APD 11 and the equalizer 12 form a full AGC (automatic gain control) loop. Although not illustrated for the sake of simplicity, normally, an electrical AGC utilizing the gain of an amplifier is provided. A timing generator 14 extracts a timing signal from the equalized electrical signal output by the equalizer 12. A decision circuit 13 identifies the level of the equalized electrical signal at a timing defined by the timing signal output by the timing generator 14 and generates a reshaped digital signal. A high-speed interface circuit (hereafter simply referred to as an interface circuit) 15 sends the reshaped digital signal to a bandpass filter (BPF) 3 and adds a supervisory signal produced and outputted by a low-speed supervisory device 40 to the reshaped digital signal that is to be transmitted. The bandpass filter 3 extracts (demodulates) a command signal in analog form from the digital signal supplied from the interface circuit 15 and sends the same to the low-speed supervisory device 40. The low-speed supervisory device (hereafter simply referred to as a supervisory device) 40 executes a procedure instructed by the extracted command. For example, the supervisory device 40 checks each structural element and sends the aforementioned supervisory signal indicative of the check results to the interface circuit 15.

The digital signal with the supervisory signal added thereto is sent to regeneration circuits 16 and 18, which respectively drive laser diodes (LD) 17 and 19 in accordance with the digital signal from the interface circuit 15. The regeneration circuit 16 serves as a normal-use circuit, and the regeneration circuit 18 serves as an emergency-use circuit. It is also possible to alter the relationship between the regeneration circuits 16 and 18 by a signal which is generated by the supervisory circuit 40 in response to a command. An optical coupler 20 passes through either the optical signal from the laser diode 17 or the optical signal from the laser diode 19. An optical receive/decision circuit 1 is made up of the APD 11, the equalizer 12, the decision circuit 13, the timing generator 14 and the interface circuit 15.

FIG. 2 illustrates a detailed structure of the supervisory device 40 shown in FIG. 1. The supervisory device 40 shown in FIG. 2 comprises a command detection circuit 5, a command switch 7 and a supervisory circuit 8. The command detection circuit 5 comprises an amplifier 51, a feedback resistor 52 connected between input and output terminals of the amplifier 51 and a comparator 53. The amplifier 51 amplifies the command signal extracted by the bandpass filter 3 (FIG. 1). The comparator 53 compares the level of the amplified command signal with a threshold level Lth, and generates a command detection signal indicative of the presence/absence of the command signal. The command switch 7 selects either the command signal output by the amplifier 51 of the command detection circuit 5 or a command signal output by a command detection circuit (not shown) related to the other (down) line in accordance with the command detection signal generated and outputted by the command detection circuit 5. The selected command signal is sent to the supervisory circuit 8.

Referring to FIG. 3, a command detection circuit 5a, a command switch 7a and a supervisory circuit 8a are related to the up line and correspond to the above-mentioned command detection circuit 5, the command switch 7 and the supervisory circuit 8, respectively. On the other hand, a command detection circuit 5b, a command switch 7b and a supervisory circuit 8b are provided with respect to the down line.

A description will now be given of the operation of the configuration shown in FIG. 3 with reference to FIGS. 4A through 4D.

Referring to FIG. 4A, when the command detection circuit 5a detects the command signal supplied from the bandpass filter 3 for the up line while no command signal related to the down line is detected, the command detection circuit 5a controls the command switch 7a so that it selects the command signal output from the command detection circuit 5a related to the up line. The command signal sent from the command detection circuit 5a is fed to the supervisory circuit 8a.

As shown in FIG. 4B, the command detection circuit 5b detects the command signal from the bandpass filter related on the down line while no command signal is detected by the command detection circuit 5a, the command detection circuit 5b controls the command switch 7b so as to select the command signal from the command detection circuit 5b. Normally, each of the command switches 7a and 7b selects the command signal supplied from the other line. Thus, the command switch 7a related to the up line selects the command signal output by the command detection circuit 5b related to the down line.

Referring to FIG. 4C, when the command switch 7a is supplied with the command signals from both the command detection circuits 5a and 5b, the command switch 7a related to the up line preferentially selects the command signal from the command detection circuit 5a related to the up line.

In the above-mentioned switching operation of the command switches 7a and 7b, the supervisory circuits 8a and 8b are supplied with the command signals and collect information about the operation of each structural element related to the up and down lines. For example, the supervisory circuit 8a checks the structural elements related to the up line and generates the supervisory signal indicating the check results, which is sent to an optical repeater coupled to the up line.

However, the aforementioned conventional optical repeater has the following disadvantage. Even when no optical input is applied to the APD 11 shown in FIG. 1, a dark current passes through the APD 11 because of the AGC control. Thus, the equalizer 12 outputs a signal (noise) having a substantially fixed amplitude level based on the dark current. In many cases, the level of the noise signal at the output of the amplifier 51 of the command detection circuit 5 is higher than the threshold level Lth (FIG. 2). In the case shown in FIG. 4C, the comparator 53 (FIG. 2) of the command detection circuit 5a detects the noise signal as if it detects the command signal on the up line. Thus, as shown in FIG. 4D, the command detection circuit 5a controls the command switch 7a so that it selects the command signal from the command detection circuit 5a irrespective of the absence of the command signal from the up line. As a result of this switching, the supervisory circuit 8a cannot supervise the structural elements in response to the command signal from the other (down) line.

SUMMARY OF THE INVENTION

It is a general object of the present invention to provide an improved optical repeater in which the above-mentioned disadvantage is eliminated.

A more specific object of the present invention is to provide an optical repeater in which the command detection circuit related to each of the up and down lines is prevented from detecting the noise signal in the absence of input signals as if the noise signal is the command signal from the corresponding line.

The above-mentioned objects of the present invention are achieved by an optical repeater provided in an up line and a down line, the optical repeater comprising:
   a first circuit related to the up line; and
   a second circuit related to the down line.

Each of the first circuit and the second circuit comprising input means, command extracting means, command detecting means, command switching means, supervising means, noise component processing means and output means.
   Input means is for receiving an optical input via a corresponding one of the up line and the down line and is for converting the optical input into an electrical signal including a data signal and a command signal.
   Command extracting means, coupled to the input means, is for extracting a command signal from the electrical signal.
   Command detecting means, coupled to the command extracting means, is for generating a command detection signal when the command extracting means extracts the command signal.
   Command switching means, coupled to the command detecting means, is for selecting one of the command signal extracted by the command extracting means of the first circuit and the command signal extracted by the command extracting means of the second circuit in response to the command detection signal.
   Supervising means, coupled to the command switching means, is for generating a supervisory signal indicative of an operating state of the optical repeater in response to the command signal selected by the command switching means.
   Noise component processing means, operably coupled to the input means, the command extracting means, the command detecting means and the command switching means, is for extracting, from the electrical signal, a noise component within a predetermined frequency range excluding a frequency of the command signal and determining whether or not the optical signal is input to the input means on the basis of the noise component and for preventing the noise component passing through the command extracting means from being directly applied to the command detecting means when it is determined that no the optical input is input to the input means.
   Output means, coupled to the input means and the supervising means, is for converting the data signal and the supervisory signal into an optical output which is transferred to a corresponding one of the up line and the down line.

The aforementioned objects of the present invention are also achieved by an optical repeater provided in an up line and a down line, the optical repeater comprising:
   a first circuit related to the up line; and
   a second circuit related to the down line.

Each of the first circuit and the second circuit comprising inputs means, command extracting means, command detecting means, command switch means, supervising means, noise component processing means and output means.
   Input means is for receiving an optical input via a corresponding one of the up line and the down line and for converting the optical input into an electrical signal including a data signal and a command signal.
   Command extracting means, coupled to the input means, is for extracting a command signal from the electrical signal.
   Command detecting means, coupled to the command extracting means, is for generating a command detection signal when the command extracting means extracts the command signal.
   Command switching means, coupled to the command extracting means, is for selecting one of the command signal extracted by the command extracting means of the first circuit and the command signal extracted by the command extracting means of the second circuit in response to the command detection signal and a switching control signal.
   Supervising means, coupled to the command switching means, is for generating a supervisory signal indicative of an operating state of the optical repeater in response to the command signal selected by the command switching means.
   Noise component processing means, operably coupled to the input means, the command extracting means, the command detecting means and the command switching means, is for extracting, from the electrical signal, a noise component within a predetermined frequency range excluding a frequency of the command signal and determining whether or not the optical signal is input to the input means on the basis of the noise component and for generating the switching control signal when it is determined that no optical input is input to the input means.
   Output means, coupled to the input means and the supervising means, is for converting the data signal and the supervisory signal into an optical output which is transferred to a corresponding one of the up line and the down line.

The command switching means of the first circuit selects the command signal extracted by the command extracting means of the second circuit when receiving the switching control signal irrespective of the presence of the command detection signal output by the command detecting means of the first circuit.

The command switching means of the second circuit selects the command signal extracting by the command extracting means of the first circuit when receiving the switching control signal irrespective of the presence of the command detection signal output by the command detecting means of the second circuit.

BRIEF DESCRIPTION OF THE DRAWINGS

Other objects, features and advantages of the present invention will become apparent from the following detailed description when read in conjunction with the accompanying drawings, in which:

FIG. 2 is a circuit diagram of a low-speed supervisory device shown in FIG. 1;

FIG. 3 is a block diagram of a general configuration of the optical repeater shown in FIG. 1;

FIGS. 4A, 4B, 4C and 4D are respectively block diagrams illustrating the operations of the optical repeater shown in FIG. 3;

FIG. 5 is a block diagram of an optical repeater according to a first preferred embodiment of the present invention;

FIG. 6 is a block diagram of a detailed configuration of a circuit related to an up line shown in FIG. 5;

DESCRIPTION OF THE PREFERRED EMBODIMENTS

Figure 1:
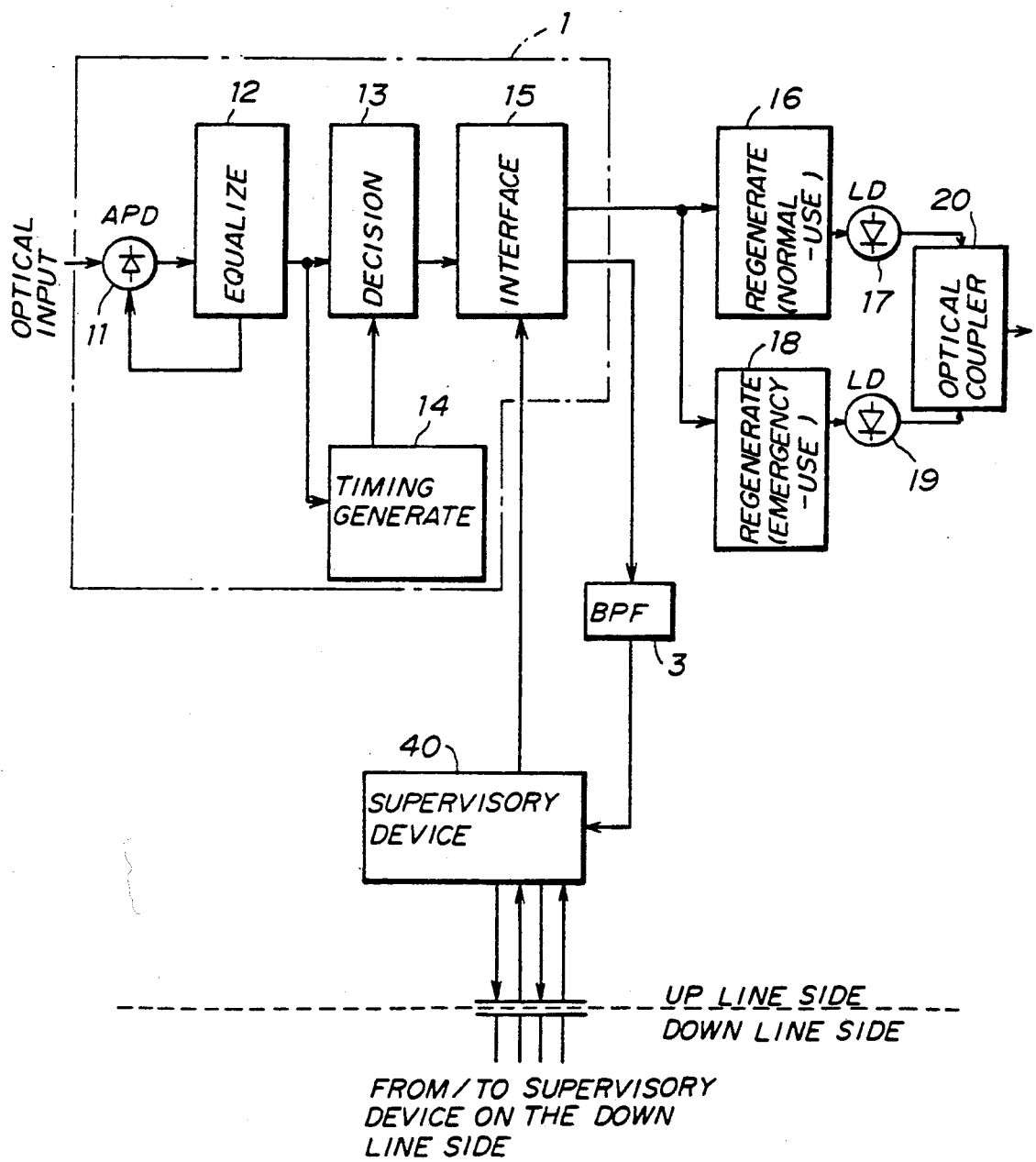
FIG. 1 is a block diagram of a conventional optical repeater.
Figure 4C:
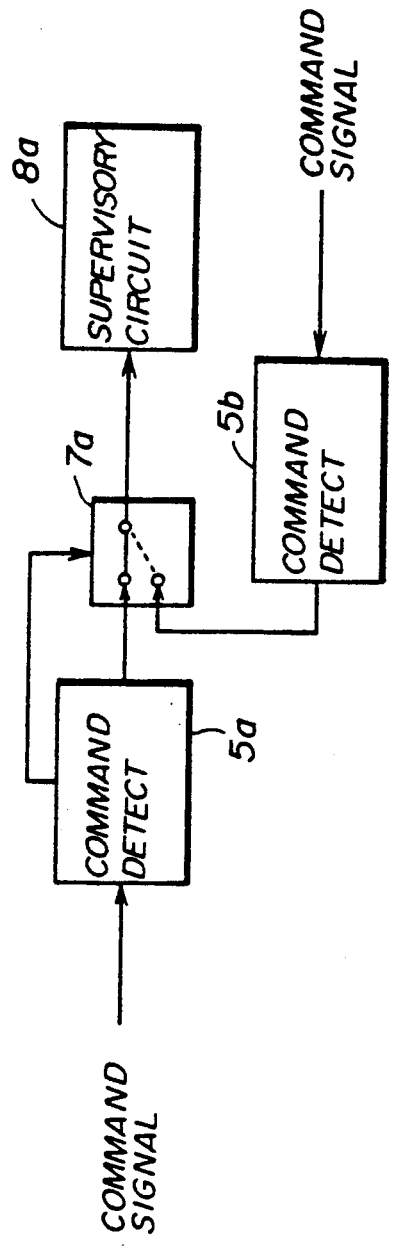
Figure 4D:
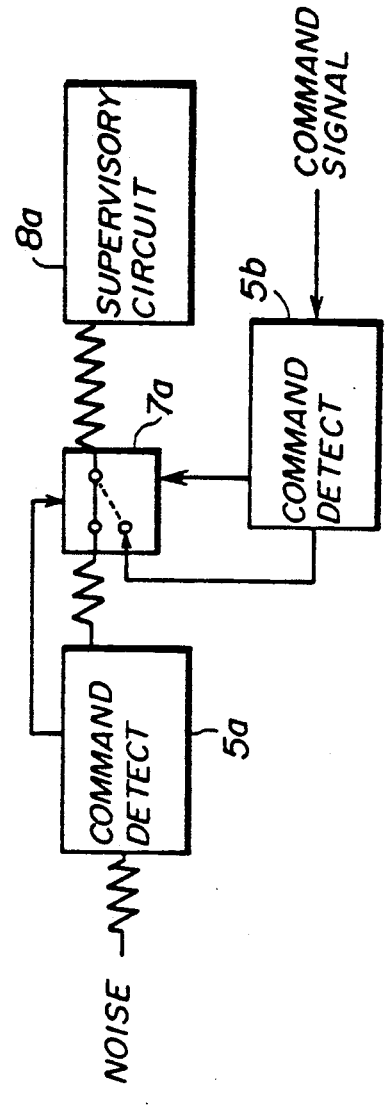

A description will now be given of an optical repeater according to a first preferred embodiment of the present invention with reference to FIG. 5. The optical receive/decision circuit (OR) 1 is provided in an up line 66a, and an optical receive/decision circuit (OR) 2 is provided in a down line 66b. A circuit 60a is connected to the optical receive/decision circuit 1, and a circuit 60b is connected to the optical receive/decision circuit 2.

The circuit 60a comprises a command extraction circuit 61a, a no-signal state detection circuit 62a, a command detection circuit 63a, a command switch 64a, a supervisory circuit 65a and a connection switch SWa. Similarly, the circuit 60b comprises a command extraction circuit 61b, a no-signal detection circuit 62b, a command detection circuit 63b, a command switch 64b, a supervisory circuit 65b and a connection switch SWb.

The no-signal state detection circuit 62a detects the state where no optical signal is input to the optical receiver/decision circuit 1 and outputs a detection signal when detecting the state. The no-signal detection means is one way to detect noise components. The command extraction circuit 61a corresponds to the aforementioned bandpass filter 3 shown in FIG. 1. The connection switch SWa is interposed between the command extraction circuit 61a and the command detection circuit 63a. The connection switch SWa is controlled by the detection signal produced and outputted by the no-signal detection circuit 62a. When an optical signal is input to the optical receive/decision circuit 1, the no-signal detection circuit 62a does not output the detection signal so that the connection switch SWa connects the command extraction circuit 61a and the command detection circuit 63a. On the other hand, when the no-signal detection circuit 62a detects the state where no optical signal is input to the optical receive/decision circuit 1, it outputs the detection signal so that the command detection circuit 63a is disconnected from the command extraction circuit 61a. The output of the supervisory circuit 65a is connected to the interface circuit 15 (FIG. 1) of the optical receive/decision circuit 1. The circuit 60b is configured in the same way as the above-mentioned circuit 60a.

During the time when no optical signal is input to the optical receive/decision circuit 1, the command detection circuit 63a is disconnected from the command extraction circuit 61a. Thus, even if the command extraction circuit 61a extracts noise from the signal output from the interface circuit 15 (FIG. 1), the extracted noise is not applied to the command detection circuit 63a. Thus, it becomes possible to prevent a malfunction of the command detection circuit 63a.

Referring to FIG. 6, there is illustrated the entire configuration related to the up line 66a. In FIG. 6, those parts which are the same as those shown in the previous figures are given the same reference numerals. The circuit 60a shown in FIG. 6 is composed of a bandpass filter 61a, a filter 62a-1, a comparator 62a-2 and a supervisory device 67a. The bandpass filter 61a corresponds to the command extraction circuit 61a (FIG. 5) and the aforementioned bandpass filter 3 shown in FIG. 3. The filter 62a-1 and the comparator 62a-2 corresponds to the no-signal detection circuit 62a and the connection switch SWa (FIG. 5), respectively. The supervisory device 67a corresponds to the combination of the command detection circuit 63a, the command switch 64a and the supervisory circuit 65a shown in FIG. 5. The output signal from the interface circuit 15 is input to the bandpass filter 61a and the filter 62a-1. The bandpass filter 61a extracts a command signal from the output signal supplied from the interface circuit 15, and generates a command signal detection signal in the same way as the aforementioned bandpass filter 3.

Figure 7:
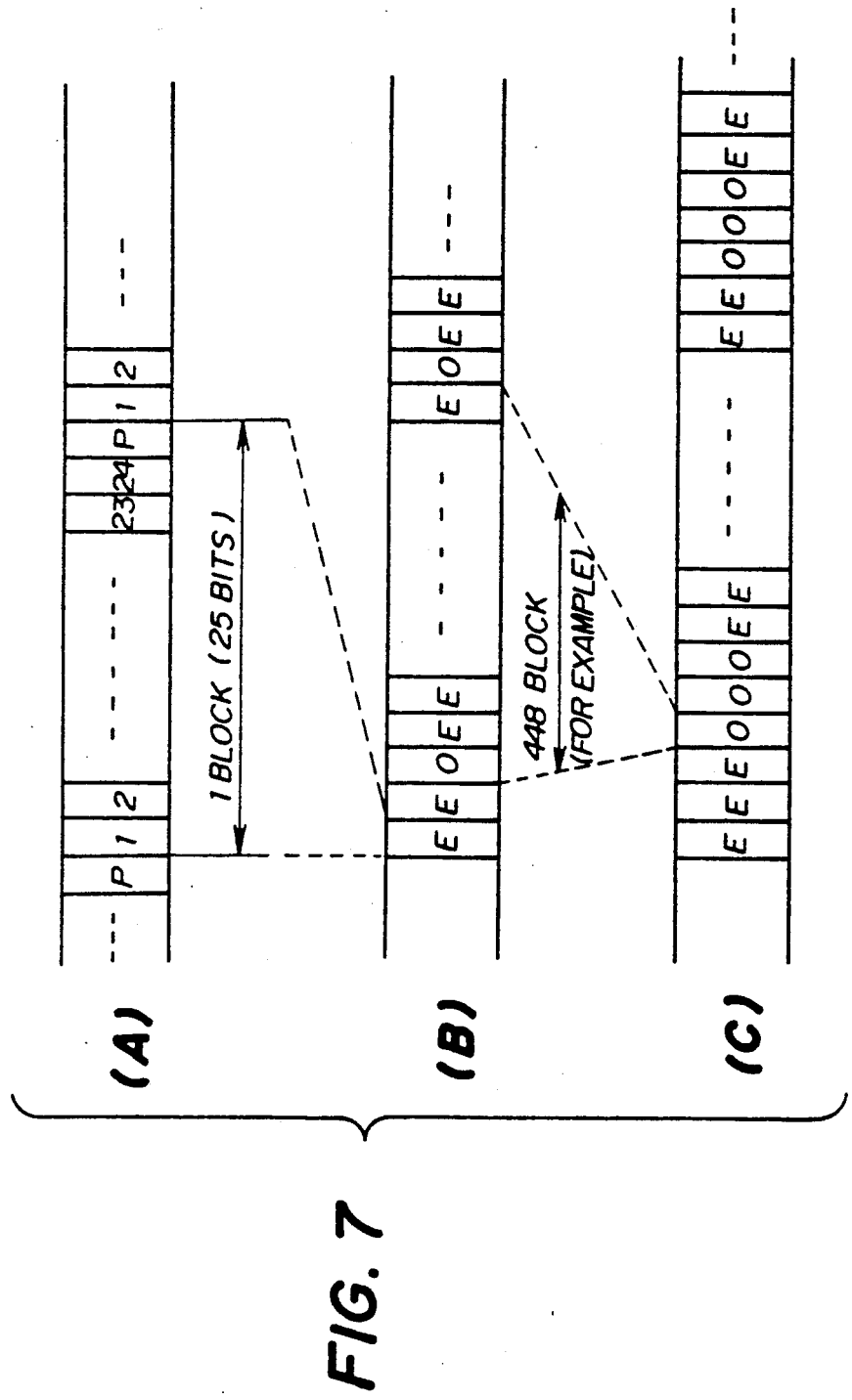
FIG. 7 is a diagram illustrating a command signal contained in a data signal.

FIG. 7 is a diagram illustrating a procedure for extracting a command signal from the output signal of the interface circuit 15. As shown in FIG. 7-(A), a data signal is grouped into blocks, each of which consists of 25 bits. The first bit (1) to the 24th bit (24) of one block are data bits. The last bit of one block is a parity bit P. Normally, the parity bit P of each block is an even parity bit E. A command signal is formed by replacing the even parity E by an odd parity bit O at predetermined intervals. FIG. 7-(B) illustrates only parity bits.

The odd parity bits O are intermittently arranged. The bandpass filter 61a shown in FIG. 6 extracts the odd parity bits O from the output signal from the interface circuit 15. Thereby, a sine wave signal corresponding to the spacing between the adjacent odd parity bits O is generated by the bandpass filter 61a. The extracted sine wave has a frequency within the bandpass frequency of the bandpass filter 61a. The generated sine wave signal corresponds to a command. The content of the command is altered by changing the spacing between the adjacent odd parity bits O. It is also possible to alter the content of the command, as shown in FIG. 7-(C). For example, the bandpass frequency range of the bandpass filter 61a is between 20 and 50 kHz.

The filter 62a-1 shown in FIG. 6 detects the level of a noise component within a predetermined frequency range.

Figure 8:
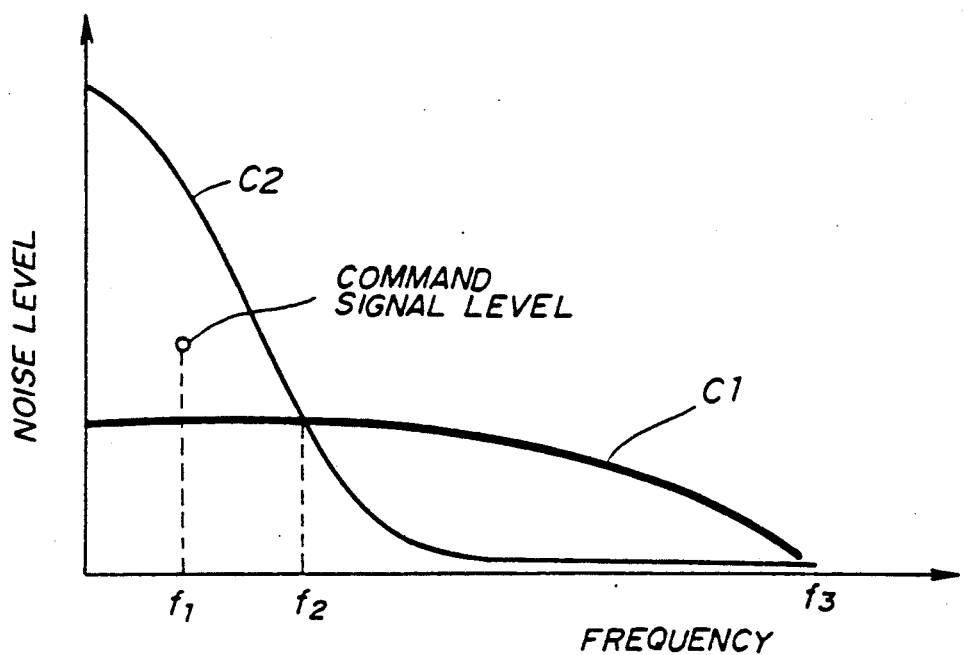
FIG. 8 is a graph illustrating noise level v. frequency characteristics observed at an output of an interface circuit shown in FIG. 6.

FIG. 8 is a graph of noise components obtained at the input of the filter 62a-1, that is, the output of the interface circuit 15 in a case where the bit rate of the data signal is equal to 591.2 Mbps. The horizontal axis of the graph of FIG. 8 represents the frequency, and the vertical axis thereof represents the level (amplitude). A curve C1 indicates a noise level change as a function of the frequency obtained when an optical input is applied to the APD 11 (FIG. 6). A curve C2 indicates a noise level change as a function of the frequency obtained when no optical input is applied to the APD 11. Frequency $f_1$ is the frequency of the command signal, and approximately equal to 26.4 kHz, for example. The curves C1 and C2 cross at a frequency $f_2$, which is approximately equal to $1-2$ MHz. The noise level obtained when the optical input is applied to the APD 11 becomes almost equal to zero at a frequency $f_3$, which is approximately between 300 and 600 MHz.

Figure 9:
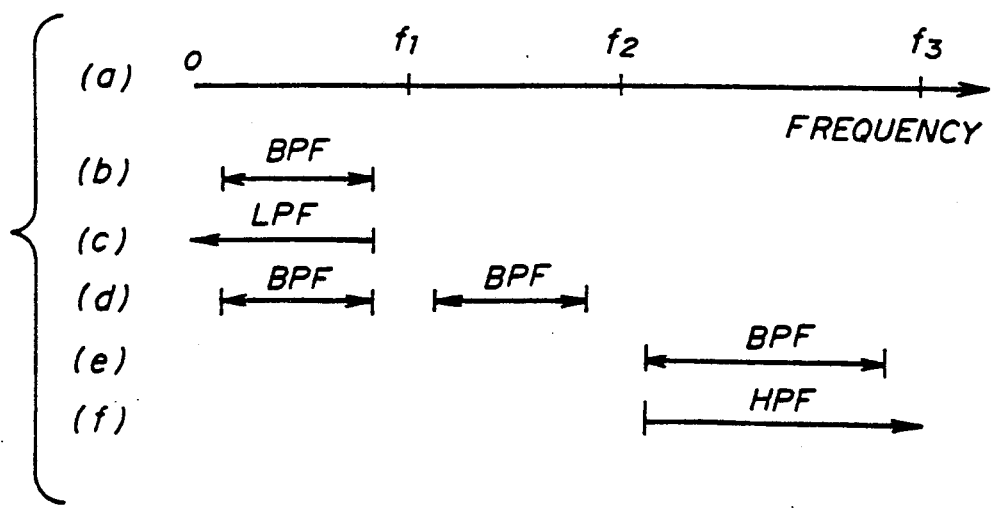
FIG. 9 is a diagram illustrating frequency ranges of a filter shown in FIG. 6.

When no optical input is applied to the APD 11, the dark current passes through the APD 11, so that the equalizer 12 generates noise components mainly having low frequencies, which are less than $1-2$ MHz ($=f_2$) in the case shown in FIG. 8. The filter 62a-1 is designed to extract the above low-frequency noise components. For example, the filter 62a-1 is formed of a bandpass filter BPF having a bandpass frequency range as shown in FIG. 9-(b) with respect to a frequency axis shown in FIG. 9-(a). In this case, the bandpass filter 62a-1 passes noise components having frequencies which are higher than zero and which are lower than the frequency $f_1$ of the command signal. For example, the bandpass frequency range of the bandpass filter 62a-1 is between 1 and 8 kHz. It is possible to substitute the bandpass filter 62a-1 for a lowpass filter LPF having a lowpass frequency range as shown in FIG. 9.-(c). This lowpass filter LPF passes noise components having frequencies lower than the frequency $f_1$ of the command signal.

The filter 62a-1 outputs the average level of the low-frequency noise components. The average level of the low-frequency noise components is compared with a threshold level TH by the comparator 62a-2. When the average level exceeds the threshold level TH, the comparator 62a-2 outputs a detection signal having a logically high level. This detection signal is applied to the connection switch SWa (FIG. 5). The switch SWa can be formed of a known electrical switch. The threshold level TH is set between the noise level of the curve C1 and the noise level of the curve C2.

Figure 10:
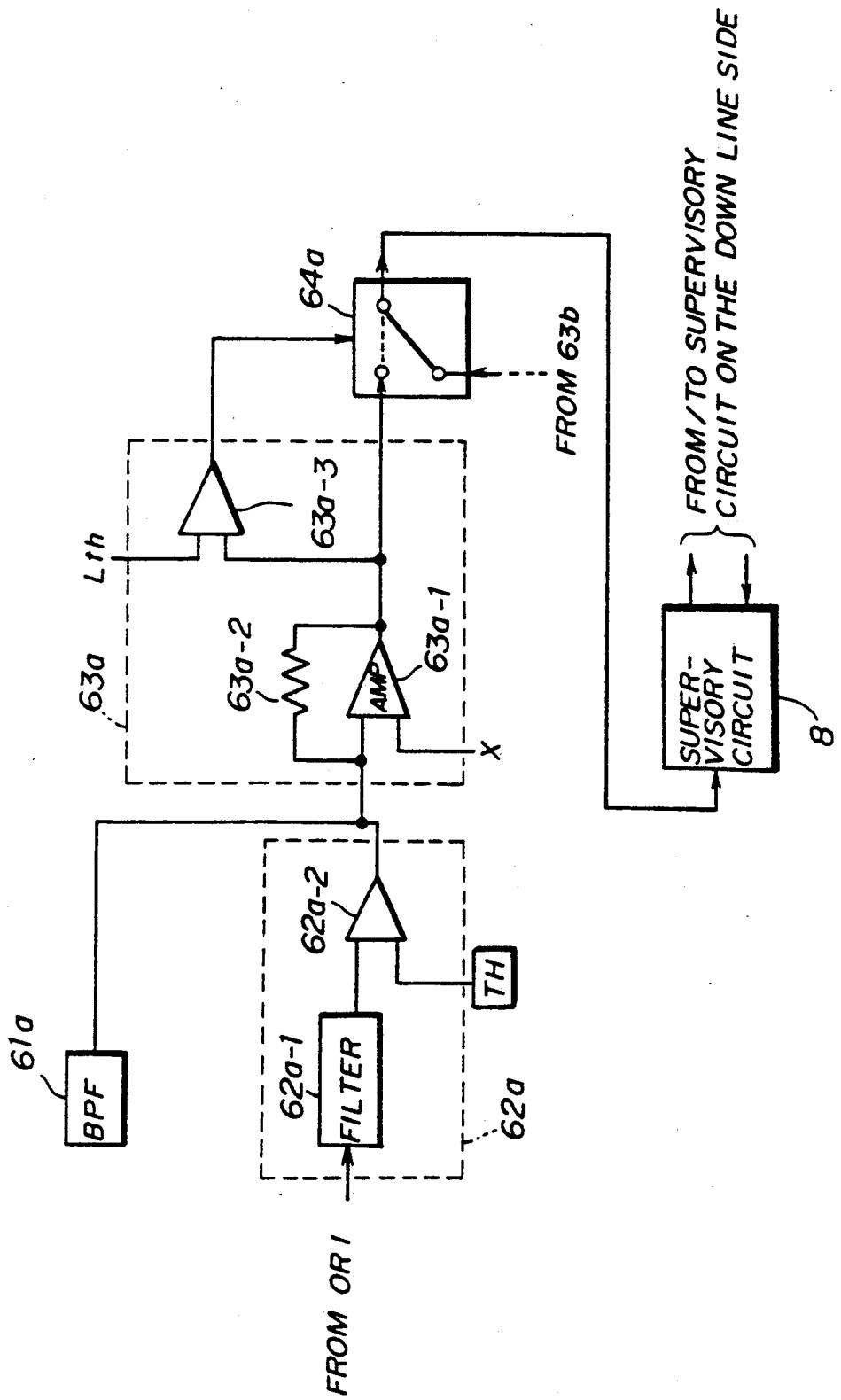
FIG. 10 is a block diagram of an optical repeater according to a second preferred embodiment of the present invention.

It is possible to utilize the detection signal generated and output by the comparator 62a-2 in a way different from that shown in FIG. 5. Referring to FIG. 10, there is illustrated a second preferred embodiment of the present invention. The detection signal output by the comparator 62a-2 of the no-signal detection circuit 62a is added to the command signal extracted by the bandpass filter 61a, and then applied to an amplifier 63a-1 of the command detection circuit 63a. A feedback resistor 63a-2 is connected between input and output terminals of the amplifier 63a-1. A threshold level X is also applied to the amplifier 63a-1. When the command signal is extracted by the bandpass filter 61a, the level of the command signal is lower than the threshold level X so that it is amplified. During this operation, the detection signal output by the comparator 62a-2 has a logically low level. On the other hand, when no optical input is applied to the APD 11 (FIG. 6) and thus the detection signal is the high level, the added result applied to the amplifier 63a-1 is higher than the threshold level X. As a result, the amplifier 63a-1 outputs a low level, which is always lower than the threshold level Lth of a comparator 63a-3, which is the same as the comparator 53 shown in FIG. 2. Thus, whenever no optical signal is applied to the APD 11 (FIG. 6), the output of the comparator 63a-3 indicates that no command detection signal is detected. Thus, the command switch 64a selects the command signal supplied from the other (down) line. In other words, the command switch 64a is placed under the control of the command detection circuit 63b (FIG. 5) related to the down line.

Figure 11:
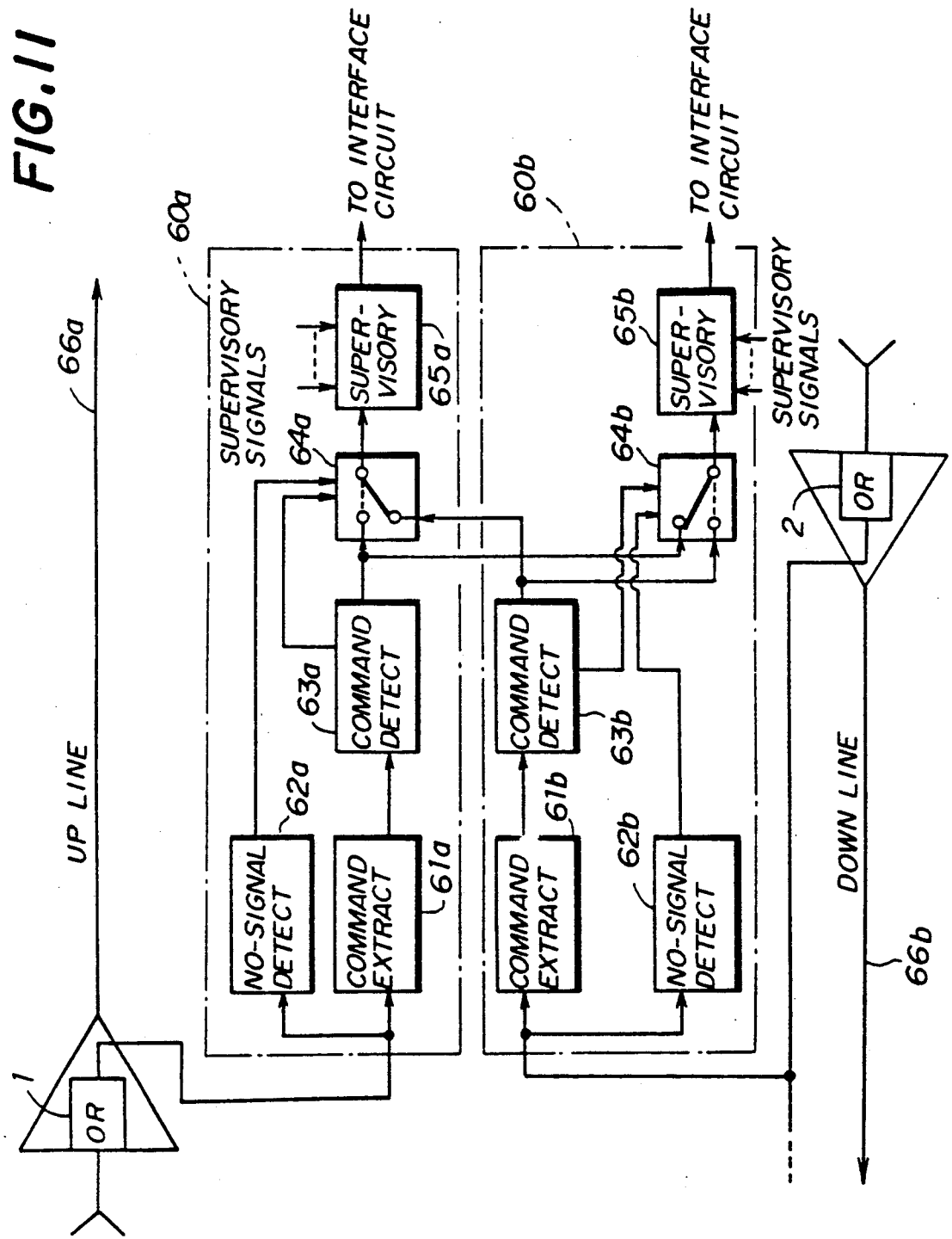
FIG. 11 is a block diagram of an optical repeater according to a third preferred embodiment of the present invention.

As shown in FIG. 11, it is possible to directly control the command switches 64a and 64b by the detection signals generated and output by the no-signal detection circuits 62a and 62b. When the detection signals serving as switching control signals are generated by the no-signal detection circuits 62a and 62b, the switches 64a and 64b select the command detection circuits 63b and 63a, respectively.

Figure 12:
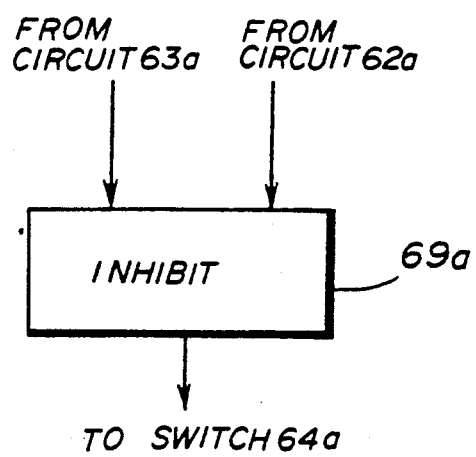
FIG. 12 is a block diagram of an inhibit circuit used in the third embodiment of the present invention shown in FIG. 11.

An inhibit circuit 69a as shown in FIG. 12 is provided at the input terminal of each of the command switches 64a and 64b. The inhibit circuit 69a inhibits the command detection signal output by the command detection circuit 63a from being applied to the command switch 64a when receiving the switching control signal generated and output by the no-signal detection circuit 62a.

The filter 62a-1 is not limited to the bandpass filter having the bandpass frequency range as shown in FIG. 9-(b) or the lowpass filter having the lowpass frequency range as shown in FIG. 9-(c). It is possible to form the filter 62a-1 so that it has the bandpass filter as shown in FIG. 9-(b) and another bandpass filter having a bandpass frequency range having a lowest frequency higher than the frequency $f_1$ and a highest frequency lower than the frequency $f_2$, as shown in FIG. 9-(d). In this case, the detection signals from the two bandpass filters are mutually added, and applied to, for example, the amplifier 63a-1 (FIG. 10).

The filter 62a-1 can be formed of a bandpass filter having a bandpass frequency range as shown in FIG. 9-(e). This bandpass frequency has a lowest frequency higher than the frequency $f_2$ and a highest frequency lower than the frequency $f_3$. As is shown in FIG. 8, the noise level at a high frequency which is considerably higher than the frequency $f_2$ is very low (almost zero) when no optical input is applied to the APD 11 (FIG. 6). Thus, the bandpass filter having the bandpass frequency range shown in FIG. 9-(e) generates a low level when no optical input is applied to the APD 11. In this case, the comparator 62a-2 (FIG. 6) is designed to output a high level when the threshold level TH is higher than the output level of the bandpass filter 62a-1. In this case, the threshold level TH is set between the noise level of the curve C2 and the noise level of the curve C1. It is also possible to use a highpass filter having a highpass frequency range which is considerably higher than the frequency $f_2$ as shown in FIG. 9-(f).

It should be noted that the filter 62a-2 (FIG. 6) does not pass through the frequency $f_1$ of the command signal whatever it is formed by. If the filter 62a-2 is designed to pass through even the frequency $f_1$ of the command signal, the noise level detection will be affected by the command signal.

The present invention is suitable for application to an optical submarine repeater in which the command signal is included in the optical signal together with data.

The present invention is not limited to the specifically disclosed embodiments, and variations and modifications may be made without departing from the scope of the present invention.

What is claimed is:

1. An optical repeater comprising:
    input means for receiving an optical input and for converting the optical input into an electrical signal including a data signal, a command signal and noise component;
    command extracting means, operatively coupled to said input means, for extracting the command signal from the electrical signal and for providing the extracted command signal; command detecting means, operatively coupled to said command extracting means, for generating a command detection signal based on the command signal of said command extracting means;
    command switching means, operatively coupled to said command detecting means, for receiving a second command signal and for selectively providing as an output signal one of the command signals and the second command signal based on the command detection signal;
    supervising means, operatively coupled to said command switching means, for generating a supervisory signal indicative of an operating state of said optical repeater in response to the output signal provided by said command switching means;
    noise component processing means for extracting from the electrical signal the noise component for determining whether or not the optical input is being received by said input means on the basis of the noise component, and for preventing the noise component from being sent to said command detecting means when said input means does not receive the optical input; and
    output means, operatively coupled to said input means and said supervising means, for converting the data signal and the supervisory signal into an optical output and for providing the optical output.

2. An optical repeater as claimed in claim 1, wherein: said command switching means includes means for selecting the second command signal when said command detecting means does not output the command detection signal.

3. An optical repeater as claimed in claim 1, further comprising:
    connection switching means for disconnecting said command detecting means from said command extracting means when said noise component processing means determines that the optical input is not input to said input means.

4. An optical repeater as claimed in claim 1, wherein said noise component processing means comprises:
    filter means for extracting the noise component from the electrical signal; and
    comparator means for comparing the noise component with a predetermined threshold level and for generating a control signal when the noise component is higher than the predetermined threshold level.

5. An optical repeater as claimed in claim 4, wherein:
    means for adding the control signal to the noise component and for preventing the noise component from being applied to said command detecting means when the optical input is not input to said input means.

6. An optical repeater as claimed in claim 4, wherein said command detecting means comprises:
    comparing means for comparing the command signal with a command detection threshold level and for generating a command detection signal when the level of the command signal is higher than the command detection threshold level;
    adding means for providing an output responsive to adding the control signal to the noise component; and
    amplifier means for amplifying the output of said adding means and for outputting a logic level which is lower than the command detection threshold level.

7. An optical repeater as claimed in claim 1, wherein said noise component processing means comprises:
    a bandpass filter, having a bandpass frequency range which is higher than zero and which is lower than the frequency of the command signal.

8. An optical repeater as claimed in claim 1, wherein said noise component processing means comprises:
    a lowpass filter, having a lowpass frequency range lower than the frequency of the command signal.

9. An optical repeater as claimed in claim 7, wherein said noise component processing means comprises:
    noise level comparing means for comparing the noise component provided by said bandpass filter with a predetermined threshold level, for providing a comparison result based on the comparison and for determining, on the basis of the comparison result, whether or not the optical input is input to said input means.

10. An optical repeater as claimed in claim 8, wherein said noise component processing means comprises:
    noise level comparing means for comparing the noise component provided by said lowpass filter with a predetermined threshold level, for providing a comparison result based on the comparison and for determining, on the basis of the comparison result, whether or not the optical input is input to said input means.

11. An optical repeater as claimed in claim 1, wherein said noise component processing means comprises:
    a first bandpass filter, having a bandpass frequency range which is higher than zero and lower than the frequency of the command signal; and
    a second bandpass filter, having a bandpass range which is higher than the frequency of the command signal and lower than a predetermined frequency.

12. An optical repeater as claimed in claim 1, wherein said noise component processing means comprises:
   a first bandpass filter having a bandpass frequency range selected to cause the noise component to be lower when the optical input is not input to said input means than when the optical input is input to said input means.

13. An optical repeater as claimed in claim 1, wherein said noise component processing means comprises:
   a highpass filter having a highpass frequency range selected to cause the noise component to be lower when the optical input is not input to said input means than when the optical input is input to said input means.

14. An optical repeater as claimed in claim 12, wherein said noise component processing means comprises:
   noise level comparing means for comparing the noise component provided by said bandpass filter with a predetermined threshold level, for providing a comparison result based on the comparison and for determining, on the basis of the comparison result, whether or not the optical input is input to said input means.

15. An optical repeater as claimed in claim 13, wherein said noise component processing means comprises:
   noise level comparing means for comparing the noise component provided by said bandpass filter with a predetermined threshold level, for providing a comparison result based on the comparison and for determining, on the basis of the comparison result, whether or not the optical input is input to said input means.

16. An optical repeater as claimed in claim 14, further comprising:
   setting means for setting the predetermined threshold level such that the predetermined threshold level is higher than the noise component when the optical input is not input to said input means and lower than the noise component when the optical input is input to said input means.

17. An optical repeater as claimed in claim 14, further comprising:
   setting means for setting the predetermined threshold level such that the predetermined threshold level is higher than the noise component when the optical input is not input to said input means and lower than the noise component when the optical input is input to said input means.

18. An optical repeater as claimed in claim 1, wherein said input means comprises:
   equalizing means for equalizing the electrical signal and for generating an equalized electrical signal;
   timing generating means for generating a timing signal from the equalized electrical signal; and
   decision means for reshaping the equalized electrical signal in synchronism with the timing signal.

19. An optical repeater as claimed in claim 1, wherein:
   said input means includes means for receiving the electrical signal, for grouping the electrical signal into blocks each having a predetermined number of bits including data bits and a parity bit and for detecting the command signal as an odd parity bit arranged in said blocks at predetermined intervals.

20. An optical repeater comprising:
   input means for receiving an optical input and for converting the optical input into an electrical signal including a data signal, a command signal and noise component;
   command extracting means, operatively coupled to said input means, for extracting the command signal from the electrical signal and for providing the extracted command signal; command detecting means, operatively coupled to said command extracting means, for generating a command detection signal based on the command signal of said command extracting means;
   command switching means, operatively coupled to said command detecting means, for receiving a second command signal, for selectively providing as an output signal one of the command signal and the second command signal based on the command detection signal and a switching control signal;
   supervising means, operatively coupled to said command switching means, for generating a supervisory signal indicative of an operating state of said optical repeater in response to the output signal selectively provided by said command switching means; and
   noise component processing means for extracting from the electrical signal the noise component, for determining whether or not the optical input is being received by said input means on the basis of the noise component and for generating the switching control signal when the optical input is not input to said input means; and
   output means, operatively coupled to said input means and said supervising means, for converting the data signal and the supervisory signal into an optical output and for providing the optical output.

21. An optical repeater as claimed in claim 20, wherein:
   said command switching means includes means for selecting the second command signal when said command detecting means does not output the command detection signal.

22. An optical repeater as claimed in claim 20, wherein said noise component processing means comprises:
   filter means for extracting the noise component from the electrical signal; and
   comparator means for comparing the noise component with a predetermined threshold level and for generating a control signal when the noise component is higher than the predetermined threshold level.

23. An optical repeater as claimed in claim 20, further comprising:
   inhibit means for inhibiting the command detection signal from being sent to said command switching means when said noise component processing means generates the switching control signal.

24. An optical repeater as claimed in claim 20, wherein said noise component processing means comprises:
   a bandpass filter, having a bandpass frequency range which is higher than zero and which is lower than the frequency of the command signal.

25. An optical repeater as claimed in claim 20, wherein said noise component processing means comprises:
   a lowpass filter, having a lowpass frequency range lower than the frequency of the command signal.

26. An optical repeater as claimed in claim 24, wherein said noise component processing means comprises:
noise level comparing means for comparing the noise component provided by said bandpass filter with a predetermined threshold level, for providing a comparison result based on the comparison and for generating, based on the comparison, the switching control signal indicating whether or not the optical input is input to said input means.

27. An optical repeater as claimed in claim 25, wherein said noise component processing means comprises:
noise level comparing means for comparing the noise component provided by said lowpass filter with a predetermined threshold level, for providing a comparison result based on the comparison and for generating, based on the comparison, the switching control signal indicating whether or not the optical input is input to said input means.

28. An optical repeater as claimed in claim 20, wherein said noise component processing means comprises:
a first bandpass filter, having a bandpass frequency range which is higher than zero and lower than the frequency of the command signal; and
a second bandpass, filter having a bandpass range which is higher than the frequency of the command signal and low than a predetermined frequency.

29. An optical repeater as claimed in claim 20, wherein said noise component processing means comprises:
a first bandpass filter having a bandpass frequency range selected to cause the noise component to be lower when the optical input it not input to said input means than when the optical input is input to said input means.

30. An optical repeater as claimed in claim 20, wherein said noise component processing means comprises:
a highpass filter having a highpass frequency range selected to cause the noise component to be lower when the optical input it not input to said input means than when the optical input is input to said input means.

31. An optical repeater as claimed in claim 29, wherein said noise component processing means comprises:
noise level comparing means for comparing the noise component provided by said bandpass filter with a predetermined threshold level, for providing a comparison result based on the comparison and for determining, based on the comparison, the switching control signal indicating whether or not the optical input is input to said input means.

32. An optical repeater as claimed in claim 30, wherein said noise component processing means comprises:
noise level comparing means for comparing the noise component provided by said bandpass filter with a predetermined threshold level, for providing a comparison result based on the comparison and for generating, based on the comparison, the switching control signal indicating whether or not the optical input is input to said input means.

33. An optical repeater as claimed in claim 31, further comprising:
setting means for setting the predetermined threshold level such that the predetermined threshold level is higher than the noise component when the optical input it not input to said input means and lower than the noise component when the optical input is input to said input means.

34. An optical repeater as claimed in claim 32, further comprising:
setting means for setting the predetermined threshold level such that the predetermined threshold level is higher than the noise component when the optical input is not input to said input means and lower than the noise component when the optical input is input to said input means.

35. An optical repeater as claimed in claim 20, wherein said input means comprises:
equalizing means for equalizing the electrical signal and for generating an equalized electrical signal;
timing generating means for generating a timing signal from the equalized electrical signal; and
decision means for reshaping the equalized electrical signal in synchronism with the timing signal.

36. An optical repeater as claimed in claim 20, wherein:
said input means includes means for receiving the electrical signal, for grouping the electrical signal into blocks each having a predetermined number of bits including data bits and parity bit and for detecting the command signal as an odd parity bit arranged in the blocks at predetermined intervals.

* * * * *

UNITED STATES PATENT AND TRADEMARK OFFICE
CERTIFICATE OF CORRECTION

PATENT NO. : 5,130,837

DATED : July 14, 1992

INVENTOR(S) : Kitamura et al.

It is certified that error appears in the above-identified patent and that said Letters Patent is hereby corrected as shown below:

[54], Title, "HAIVNG MEANS FOR PREVENTING" should be --THAT PREVENTS--.

Col. 1, title, "HAIVNG MEANS FOR PREVENTING" should be --THAT PREVENTS--.

Col. 2, line 46, after "4B," insert --when--.

Col. 4, line 27, after "prising" insert --:-- and delete rest of the line;

delete lines 28, 29 and 30.

Signed and Sealed this

Fifth Day of October, 1993

Attest:

BRUCE LEHMAN

*Attesting Officer*     *Commissioner of Patents and Trademarks*